United States Patent Office.

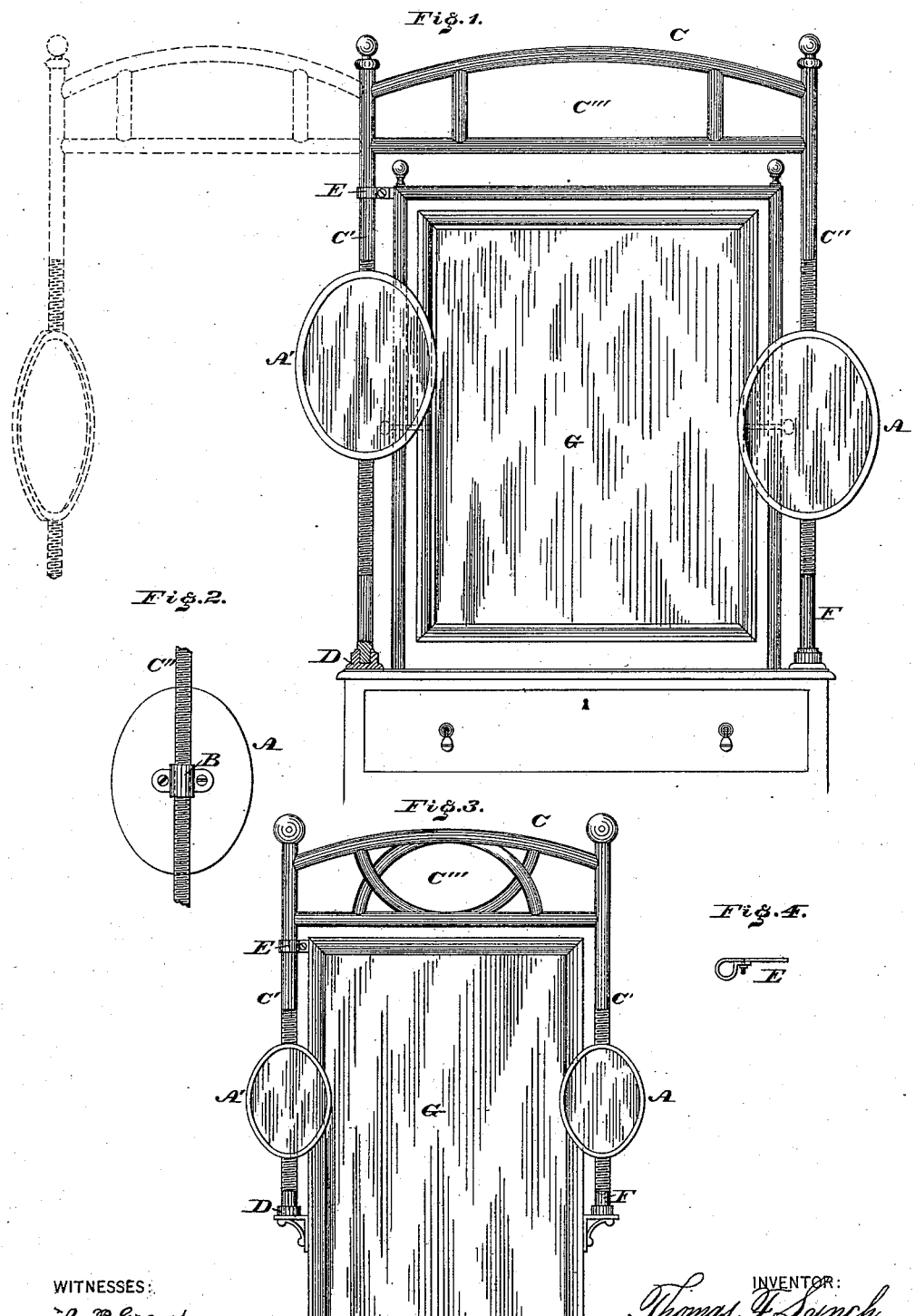

THOMAS F. LYNCH, OF PHILADELPHIA, PENNSYLVANIA.

ADJUSTABLE MIRROR.

SPECIFICATION forming part of Letters Patent No. 312,568, dated February 17, 1885.

Application filed February 23, 1884. (No model.)

*To all whom it may concern:*

Be it known that I, THOMAS F. LYNCH, a citizen of the United States, residing in the city and county of Philadelphia, State of Pennsylvania, have invented a new and useful Improvement in Adjustable Mirrors, which improvement is fully set forth in the following specification and accompanying drawings, in which—

Figure 1 is a front view, partly sectional, of an adjustable mirror embodying my invention. Fig. 2 is a rear view of a detached portion. Fig. 3 is a front view of a modification. Fig. 4 is a top view of a clamp employed.

Similar letters of reference indicate corresponding parts in the several figures.

My invention consists of a swinging frame carrying a mirror, which may be vertically and laterally adjusted relatively to another mirror or looking-glass, so that a person using the same may view different parts of his head and neck, his back, shoulders, &c.

Referring to the drawings, A represents a mirror or looking-glass having secured to the rear of its frame a boss, B, which is internally threaded.

C represents a swinging frame consisting of uprights C' C'' and a cross-bar or portion, C''', connecting the same. The upright C' is rested on a step, D, so as to be rotatable thereon, and is further retained in position by a screw clamp or eye, E, which, serving to hold the frame C in position, also forms portion of the axis thereof. The upright C'' is threaded and has the boss B of the mirror or glass A fitted to the same, whereby said mirror or glass may be raised and lowered by properly rotating it on said upright C''.

F represents a piece which supports the upright C'', its upper end having a socket or depression to receive the lower end of the upright, said end, being pointed to enter the socket or piece F, may be pointed at top to enter a socket on the bottom of the upright, the depth of the socket being sufficient to hold the upright in position, but admitting of the disconnection of the same by slightly raising it. The upright C' is also threaded, and has a mirror or glass, A', connected therewith similar to the glass A; but this is not considered an essential feature. The step D and supporting-piece F are secured to a base rested, in Fig. 1, on the top of a bureau or toilet-stand, and the uprights C' C'' are located at the sides of the swinging looking-glass or mirror G of said bureau or stand.

In Fig. 3 the step and piece D F are supported on brackets attached to the frame of a stationary mirror or looking-glass, G, of a bureau or toilet-stand; but I do not limit my invention to the use with such article of furniture, as it may be employed with a mirror or glass hung on the wall, and the step and piece D F are supported on brackets, &c., secured to the wall. In either case the clamp E is attached to the frame of the mirror or glass G for supporting the upright C' and retaining the frame C in position.

It will be seen that by loosening the clamp E and raising the upright C'' clear of the piece F, the frame C may be swung around on the step D and clamp E as an axis. The mirror or glass A may now be adjusted the required height relatively to the glass G or the mirror A', or both, and moved with the frame C in such position required that a person may have his head, neck, shoulders, back, &c., reflected in the glasses, so as to present different views thereof, such provision being serviceable for dressing, shaving, &c. When the glass A is properly adjusted, the screw of the clamp E is tightened, so that the frame C is rendered immovable, and the parts retain their adjusted position.

The mirror A' may be adjusted a desired height previous to locating the frame C on the bureau or brackets; but this may be subsequently accomplished by releasing the clamp E and lifting the upright C' clear of the step D, after which said mirror A' is rotated the required direction and extent, and the parts reapplied. When further service of the mirror A is not required, the clamp E is loosened and the frame swung back to its normal position, the upright C'' dropping into the socket of the piece F, thus locking the frame and retaining the same in position.

If desired, the threads on the uprights may be dispensed with and the bosses of the mirrors A held by set-screws, which are passed through the bosses and tightened against the uprights.

Having thus described my invention, what I claim as new, and desire to secure by Letters Patent, is—

1. The looking-glass G and its supporting-frame, in combination with the mirror A, the swinging frame C, the step D, and the piece F, having a socket in its upper end, the piece C' of the swinging frame C being rested on the step D and connected with the frame of the looking-glass by the eye or hinge E, substantially as and for the purpose set forth.

2. The looking-glass G and its supporting-frame, in combination with the mirror A, the swinging frame C, the step D, and the socket and supporting-piece F, said mirror being vertically adjustable on one of the uprights of the frame C, substantially as and for the purpose set forth.

THOMAS F. LYNCH.

Witnesses:
JOHN A. WIEDERSHEIM,
A. P. GRANT.